United States Patent [19]

Zopfi

[11] 3,998,478
[45] Dec. 21, 1976

[54] JOINT CONSTRUCTION WITH SEALING GASKET FOR JOINTS WITH PLASTIC OR OTHER PIPES

[76] Inventor: William L. Zopfi, 899 Drayton Road, Ferndale, Mich. 48220

[22] Filed: Aug. 30, 1974

[21] Appl. No.: 496,371

Related U.S. Application Data

[63] Continuation-in-part of Ser. No. 269,137, July 5, 1972, abandoned.

[52] U.S. Cl. ............................ 285/110; 277/207 A; 285/345; 285/369
[51] Int. Cl.² ........................................ F16L 17/02
[58] Field of Search .......... 285/110, 230, 231, 345, 285/369; 277/207 A, 207 B, 207 R, 208, 209

[56] References Cited

UNITED STATES PATENTS

| | | | |
|---|---|---|---|
| 217,249 | 7/1879 | Tasker | 285/369 X |
| 1,817,774 | 8/1931 | Sipi | 285/231 |
| 2,245,154 | 6/1941 | McWane | 277/207 A X |
| 2,980,449 | 4/1961 | Dunton | 285/369 X |
| 3,081,102 | 3/1963 | Murray et al. | 277/207 A |
| 3,198,560 | 8/1965 | Collins | 285/345 X |
| 3,400,954 | 9/1968 | Brown | 285/110 |
| 3,414,273 | 12/1968 | Sumner | 277/207 A |
| 3,573,871 | 4/1971 | Warner | 285/110 |

FOREIGN PATENTS OR APPLICATIONS

| | | | |
|---|---|---|---|
| 770,502 | 10/1967 | Canada | 277/207 A |
| 247,518 | 12/1947 | Switzerland | 277/207 A |
| 1,080,816 | 8/1967 | United Kingdom | 285/110 |
| 1,083,451 | 9/1967 | United Kingdom | 285/110 |

*Primary Examiner*—Thomas F. Callaghan
*Attorney, Agent, or Firm*—P. D. Golrick

[57] ABSTRACT

A sealing joint construction with gasket for joints especially in or with plastic pipes, such as electrical or telephone conduit pipes, drainage or sewer conduit pipes, either bell-and-plain-spigot type pipe or plain end pipe connected by a coupling fitting or pipe and other drainage fittings, characterized by use of a smooth non-grooved, non-ribbed spigot male and bell-like female joined element ends telescoped in bell-and-spigot fashion, the female end being double-belled to receive snugly the innermost spigot end and outwardly thereof to define an annular recess of narrow gap or width and of considerable axial depth, and, inserted in the recess, a limp, pliable, endless, i.e. closed or annular, unitary, thin ribbon form gasket made of smooth surfaced polyvinyl chloride or the like; the gasket comprising a thin sleeve-like body externally smooth and having a set of axially spaced, integral pliable internal annularly continuous sealing and gripping fins or ribs, and on the outer gasket end, a circumferentially continuous external radial flange to engage the bell end; the gasket having a spigot lead-in internal bevel at its outer end or mouth, and one heavy rib occurring at the gasket inner end; in the gasket free state, the radial thickness of the ribs plus body being greater than the recess gap; those other than the inner end rib preferably being of shape and thickness to be more readily compressed and deflected, when located in the bell, by the entering spigot end than the inner end rib; with the smooth cylindrical gasket exterior and bell interior enabling the spigot end, in encountering the successive ribs, axially to stretch, and thereby radially thin, the gasket, and for the added ease of insertion upon encountering the innermost rib finally before complete spigot insertion, axially to stretch the gasket over its length, as permitted by the recess depth exceeding the gasket inserted length, whereby seal is achieved upon spigot insertion past the inner rib and relief of gasket stretch.

15 Claims, 6 Drawing Figures

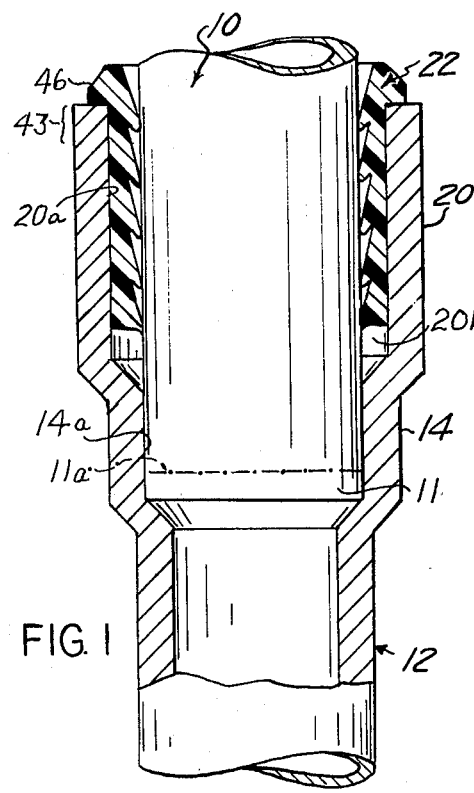
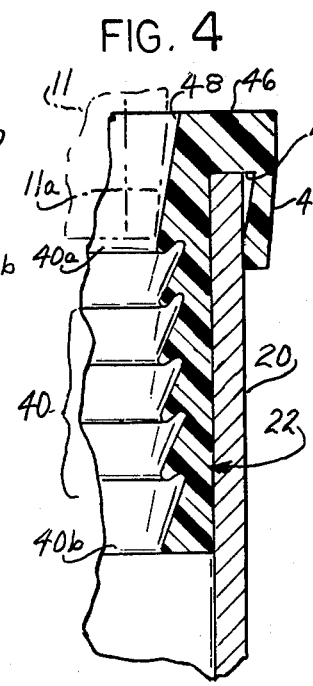
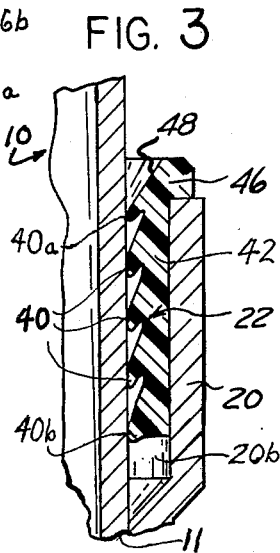
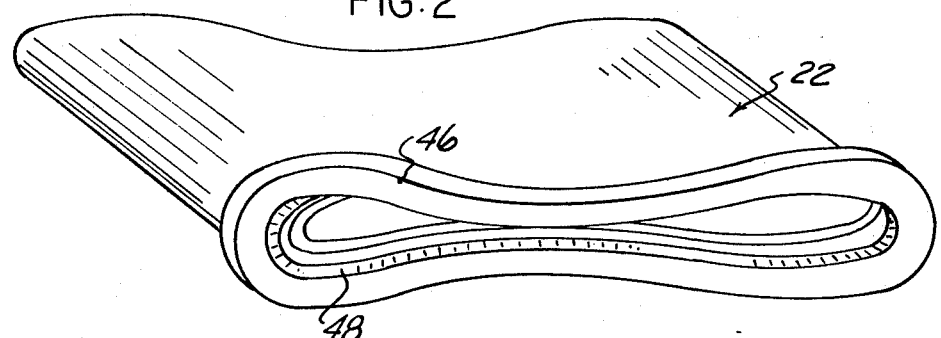
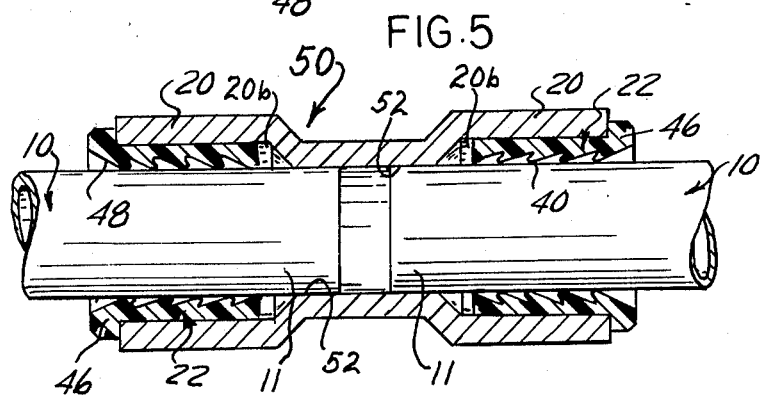

JOINT CONSTRUCTION WITH SEALING GASKET FOR JOINTS WITH PLASTIC OR OTHER PIPES

This application is a continuation in part of application Ser. No. 269,137, filed July 5, 1972 now abandoned; and relates to joints with gaskets for plastic or other pipes and particularly to joints with gaskets used between preferably standard sized piping elements joined to one another with a spigot or male end of one fitting into a bell type female end of the other; pipe fittings or pipe-connected devices being comprehended among the piping elements to be joined.

PRIOR ART

The prior art has proposed various expedients to be used in the coupling of male and female ends of plastic or other pipes. One such expedient has used a cement, usually of the solvent type, in the joint between the belled female end and the smooth plain spigot or male end of respective elements to be jointed. In other joints, a doughnut type sealing ring, such as an O-ring, has been rolled or jammed into the annular gap or space between a belled female end and a male end coaxially inserted therein. In some instances both expedients have been used together. In other constructions the belled female end, and at times the spigot male end, have been ribbed or grooved to engage corresponding complementary formations of a gasket collar having integral internal and external fins or ribs; or mechanical means have been used to expand or hold a gasket in sealed relation between telescoped elements.

For a variety of reasons, the use of an O-ring or a doughnut type ring as described above, despite simplicity of construction, has not proven satisfactory; while the other more complex gasket forms or joint constructions have entailed use of special pipe formations, additional elements or special installation tooling with attendant material and labor costs for manufacture of the components or for the installation in the field. Thus in the field operations, prior joints have been hard to install, or unwieldy for field handling, contributing to installation costs, and among other problems subject to poor installations by errors of gasket selection or placement.

Among the simpler gasket prior art joint forms, the O-ring type joint more widely used for plastic pipe in practice requires a long bell, to permit a rolling travel of the O-ring, as the gasket-bearing male end ring is inserted into a bell; and also a bell of considerable flare or radial extension beyond the barrel or normal exterior of the pipe.

The large size of the flared bell also represents additional cost in plastic material consumption, and in working a greater amount of material for the pipe fabrication.

The variability of placement of the ring on the spigot end or the manner of insertion engagement with the bell results in uncertainty in final lodgement of the gasket between bell and spigot, with the possibility that the ring does not roll even into an initial firm seal, with the result that it will not sustain operating back pressures without leakage. Otherwise the O-ring joint is subject to leakage, especially upon plastic pipe deflection under weight of back fill in a trench, or under pipe contraction effects upon cooling in the trench, where it should happen that the pipe had been layed while warm.

Moreover, with the large flare bell typically used, unless the pipe is carefully bedded to be centrally supported in each length between bells, the large bells at each pipe length end in effect tend to support the pipe length as a beam subjected to a corresponding downward central deflection or bowing under back fill weight. That bending deflection both strains the joints and forms a concavity to accumulate sediments or other solids borne in the liquid handled thus to prevent proper drainage.

GENERAL CONSIDERATION OF INVENTION

The general object of the present invention is to provide an improved joint construction for pipe which enables use of a simple low cost gasket and comparatively simple cooperating structure for joined elements.

Another object of the invention is to provide a joint structure utilizing a gasket form effective for the stated purpose which is readily producible primarily by an extrusion operation followed by simple end-welding to an annular form.

Still another object is to provide a gasketed joint structure wherein a gasket, of simple sleeve-like internally ribbed form, is essentially self-holding and sealing in an annular space as defined between a plain spigot or male pipe end and a receiving bell or female formation of another element joined therewith.

A still further object is the provision of a compact joint construction for joining pipe, especially plastic pipe, or plastic pipe and plastic pipe fittings, and the like.

Another object is the provision of a sealed joint structure particularly adaptable for use with plastic pipe, such as electric or telephone conduit and especially low pressure drainage or sewer pipe, which obviates need for adhesive or solvent bonding of telescoped pipe end formations, such as a plain spigot end and belled end of plastic pipe.

Another object is the provision of a joint construction, particularly a gasketed joint construction for plastic pipe, which obviates any need for adhesively bonding the gasket to either of telescoped pipe end structures or formations, for the purposes of obtaining gasket sealing or retention in the joint; through for some incidental purposes, such as shipping pipe lengths with the requisite gaskets applied in female bells, adhesive may be used for certain forms of the invention though in a further elaboration of the invention for even this purpose adhesive use is eliminated.

A still further object is the provision of a gasket joint construction, especially for plastic pipe of the type described, which eliminates need for any grooving or ribbing of male and/or female pipe joining end formations, and is easy to assemble while yet obtaining a good seal.

Broadly considered, the invention provides a plain smooth spigot end on a pipe length, a pipe or drainage fitting or the like; on the second conduit element of the joint, i.e., the other pipe, or a pipe or drainage fitting, a "double-belled" formation providing an inner "bell" to snugly receive the innermost spigot end and an outer larger bell defining a narrow annular gap or recess to accommodate a thin annular "ribbon" gasket, the bell formation interior surfaces also being smoothly cylindrical in the sense of being devoid of annular ribs or grooves, though slight taper may be present, for conformation thereto of a similarly smooth exterior of a limp gasket portion inserted in the bell; the gasket having certain interior annular sealing ribs or fins, and an external end and mouth formation, and proportioning relative to the gap defining areas, which enables easy assembly of gasket into a bell and allows certain axial partial gasket shift to facilitate spigot insertion into the gasketed bell, while obtaining a good durable seal in a simple joint structure.

The present invention provides a simple joint structure, having a low profile gasket-receiving bell with a reduced flare or diameter, and shorter length than what is commonly now used for O-ring sealed plastic pipe, with avoidance of the problems engendered by flare size, costs of materials and operation in the large belling, and the uncertainties of gasket lodgement on spigot insertion; while bedding precautions are obviated or less critical in laying and back filling for acceptable grade.

Costs in component fabrication, i.e., pipe and gasket, or coupling fittings where used, in joint assembly and installation operations, and as well to a degree in trenching, bedding and back-fill, may be severally and cumulatively reduced for overall cost savings.

This application discloses for the above purposes a novel form of joint and sealing means or gasket, particularly adapted for the uses here described, the requisite details, features and advantages of which will later be outlined more fully.

A preferred embodiment of the gasket for such joint is disclosed here only by way of example, it being understood that a wide variety of configurations may be developed, of which the basic form illustrated in the appended drawing is but one example.

IN THE DRAWINGS

FIG. 1 is an axial sectional view showing a pipe joint with a gasket in place;

FIG. 2 is a perspective view of a gasket of a preferred embodiment, in the form in which it is received by the prospective user;

FIG. 3 is a somewhat enlarged fragmentary sectional view of a part of FIG. 1;

FIG. 4 is an enlarged fragmentary cross sectional view of a modified form of the gasket and an adjacent wall portion of a pipe bell in which the gasket is inserted;

FIG. 5 is a longitudinal or axial section of a double-sealed pipe coupling fitting affording an expansion joint;

DETAILED DESCRIPTION

Figure 6:
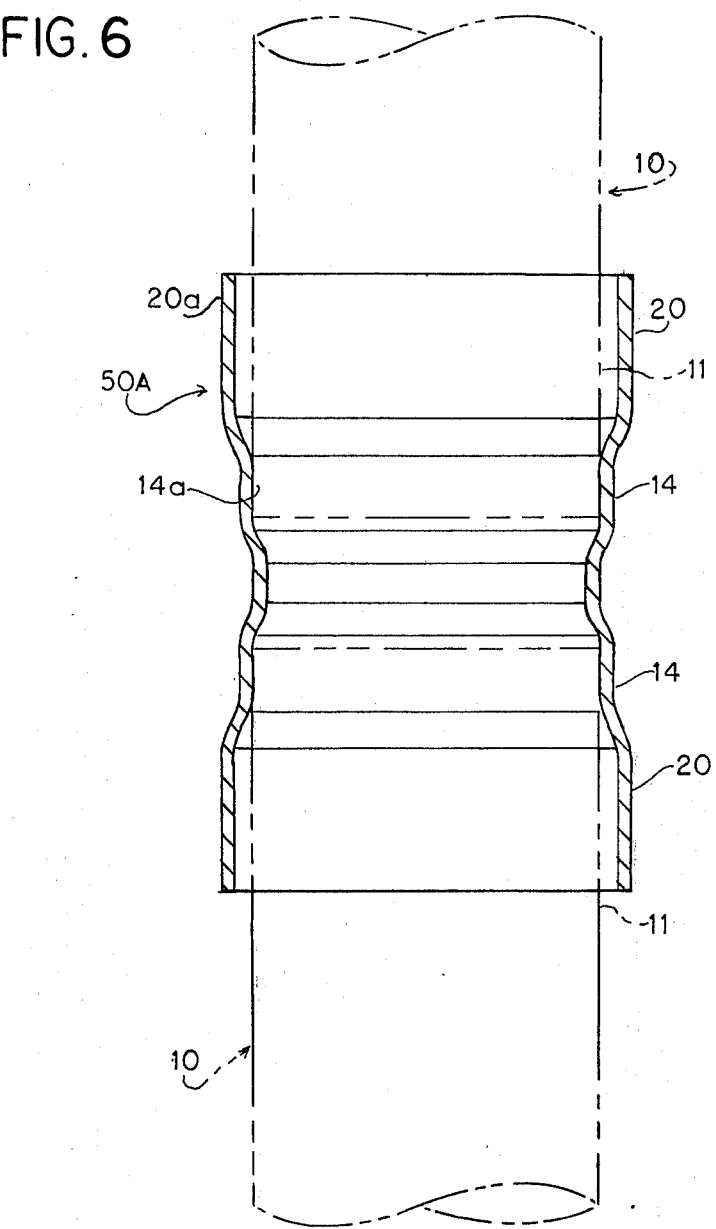
FIG. 6 is also a longitudinal axial section through a coupling fitting.

FIG. 1 shows a pipe joint useful and appropriate for pipes of a nominal size of about 1½ inches or so and larger.

One pipe 10 has a smooth plain spigot or male end 11 received in an enlarged bell type female end of the other pipe 12. In the instance shown, which is only illustrative of the joining of pipes of the same nominal size, and which need not be the case for every useful application of the invention, the female end has what might be termed a "double-bell" form having an inner belled or enlarged throat portion 14 which has an inner diameter intermediate that of the barrel or normal nominally sized pipe 12 and that of the larger outer bell portion 20. The inner diameter of 14 either is slightly larger than, or preferably has a very light interference fit with, the outside diameter of the spigot or male pipe end, so that the plain spigot end 11 is snugly received therein as in a socket.

In all instances, the female end outer large bell 20 thus defines, with and about the spigot end 11, an annular space of considerable axial depth inside which a sealing means comprising gasket 22 is located, providing a sealed joint between the pipes 10 and 12.

The inner circumferences of the bell portions 14 and 20 are smooth, that is, devoid of circumferential ribs, ridges or grooves, being in this sense substantially cylindrical, though a slight inward taper is usually to be expected in each by standard production methods and tolerances accepted especially in the plastic pipe industry, and at 14a can usefully serve to provide a slight interference fit for all pipe or joined components within the intended production tolerances.

Though shown for simplicity with each surface abruptly terminating in a bevelled shoulder, it is to be understood that the outer bell generally preferably merges into the inner bell, and the inner bell into the nominal pipe or barrel size in smooth curves as in FIG. 6; and that the wall thicknesses are not represented in what would be normal proportions to the pipe size or bell axial lengths for plastic pipe manufacture by current methods.

It may be here observed that the specific joint structures between telescoped female and male conduit and piping elements shown in the various figures, though spoken of in the terms of bell and spigot and for convenience described relative to joining ends of lengths of pipe as such, are representative of joint structure to be used for other items compatible in design for use with pipe. That is, the bell formation or the spigot may occur in fittings such as elbows, Tees, couplings; or on other devices incorporated in or attached to the pipe, for example, a cleanout, or perhaps on the body of a drain.

The improved sealing means presented by the gasket 22 of the invention is shown by way of illustration in FIGS. 2–3 and in a modified form in FIG. 4. When received by the user, it is in the form of a limp pliable endless (that is, annular) unitary thin ribbon-bodied gasket 22 of considerable axial length, but preferably is appreciably shorter than the length of the large or outer bell 20, i.e., shorter than the depth of the annular recess, so as not to occupy all of the interior length of bell 20 in which it is nested for purposes to be explained. The gasket is pliable for function in use and for convenience of packaging in collapsed form if desired; is limp in its totally free state as in FIG. 2; and is fabricated with smooth surface, for example, from an elastomer such as polyvinyl chloride or the like.

The following definitions will be useful with respect to the state and condition of the gasket or shaping of its fins or ribs:

"Totally free state or condition", signifies the condition of the gasket as completely fabricated, but not supported by insertion in a bell of a pipe end;

"Installed free state or condition", signifies the condition of the gasket, with its shape and relation of parts, particularly fin dispositions, when inserted into proper conforming disposition within a bell formation on a pipe end or the like.

By "undercut" fin or rib is meant one having a generally sloped or convergent top face or surface, usually rounding through a small radius into an under surface which slopes upwardly back to the gasket body, to make roughly an acute angle with the body, which in effect is re-entrant relative to the general fin radial cross section, though the top and under surface may be curved in that radial section.

By an "overhanging" fin or rib is meant one having an under-surface running substantially radially, i.e., to make substantially a right angle with the body, and into which the sloping top face usually rounds through a small radius.

By a "rounded" fin or rib is meant one presenting, e.g., a semi-circular, or downwardly widening or thickening half tear drop section projecting inwardly from the gasket body.

The gasket as shown may be considered as constituted (when it assumes its as-used shape as inserted in the cylindrical interior of bell 20 ready to receive the spigot of 10), of a basic thin cylindrically annular body 42 externally conformed to the interior of bell 20 and having a set of axially spaced integral internal pliable annularly continuous gripping ribs or fins for sealingly engaging the plain spigot or cylindrical male end 11 of the pipe 10, namely, 40a at the mouth, 40b at the inner end, and a plurality of intermediate fins or ribs 40 therebetween. Of these, fins 40 and 40a are preferably "undercut" beneath their "crests", i.e., annular free edges; while 40b is not, but rather represents a continuous thickening of the gasket section toward its crest at the gasket inner end.

Each fin or rib as shown thus includes an upper (or outer) surface of more or less female conical shape from which the inner or under surface (except at 40b) reentrantly runs out to the gasket body portion as a flatter conical surface in an "undercut" shape; and the ribs, i.e., crests, have an inside diameter notably smaller than the spigot outside diameter.

On the outer end of the gasket, an integral circumferentially continuous annular laterally directed lip or flange 46 affords at least a radial shoulder as a stop formation which engages the outer end edge of bell 20 to retain the gasket against inward axial displacement; and, as shown more clearly in FIG. 3, the upper female conical surface of the topmost rib 40a is continued in an outwardly and upwardly expanding taper 48, to the axial outer end of flange 46, defining a beveled gasket mouth with outer diameter notably larger than the spigot, as a guide opening for more ready entrance insertion of pipe 10. The spigot end edge, as at 11a in FIG. 4, may have a chamfer or taper say of 30° for this purpose.

Though unnecessary for attainment of seal, and merely for convenience in assembly in some instances, or for retention after pre-application by the pipe manufacturer, the gasket may be secured therein by a suitable solvent adhesive along the conforming surfaces as at 43. The roll over lip 46a in FIG. 4 is a greater convenience for these last named purposes.

The axial length of the part of the gasket inserted in the bell is such that as installed before insertion of the spigot 11 therethrough, there is an inner end spacing 20b of the gasket from the shoulder or contraction marking the bottom of the recess or annular gap.

Further, preferably as the gasket is being hand-inserted to bring the under surface of flange 46 against the outer bell end face or edge, the inner end of its male outer surface first encounters the female surface 20a of the bell before completion of insertion movement — here recognizing the usual fact of a slight female taper rather than a strict cylindrical surface — so that the gasket body inner end exterior surface interferes slightly during the complete manual insertion; in this sense then, the outside "diameter" of the body being slightly "oversize" relative to the bell inside diameter, at the region of the bell which is initially gasket-engaged in making the spigot insertion. For some reason presently unknown, this "oversize" relation facilitates spigot insertion as compared to a condition where the gasket body male exterior is precisely complementary or even slightly "undersized", relative to the bell female interior surface finally contacted by the gasket body upon complete spigot insertion.

The spigot 11 is inserted through the emplaced gasket and snugly into the inner or small bell portion 14 seemingly with gasket behaviour as later postulated for the structure detailed. In FIG. 1, the spigot 11 extends to the shoulder at the lower end of the throat or smaller bell 14, but it is contemplated that said inner end could be spaced outwardly thereof to thus provide space for expansion or contraction of the pipe 10, as indicated by dotted line 11a in FIG. 1; which also presents a typical location within manufacturing tolerances of an interference seating of the spigot inner end with the inner female taper in the joint shown, in FIG. 1.

Though shown rather angularly as deflected by the inserted spigot, the integral fins 40 may be rounded, or undercut, or overhanging, in their free undeflected state, representing variations of the form here shown, as long as the section thereof in conjunction with the gasket body thickness for the material used provide in the correlated gap sizing and structure the behaviour hereinafter noted, to grip the inserted spigot end 11 of pipe 10 and seal the space between the spigot and larger bell.

In many instances the gasketing-joint relation will also assist in holding the pipe 10 firmly in position in the bell against deflecting and withdrawal forces in pipe laying operations as well as hydraulic sealing in a drainage or sewer pipe line.

In some instances the gasket preferably is provided with an additional external holding formation, by use of an external annular roll-over lip structure by extending the radial flange 46 across the thickness of the end of outer bell 20 to an intergral dependent skirt or lip 46a which embraces the cylindrical external circumference at the outer end of the bell 20, as shown at 46–46a for example, in FIG. 4, which also shows some degree of modification of the internal fins.

In addition to holding of the top or mouth end of the gasket against "fish-mouthing", that is, curling or distorting inwardly under frictional engagement of the inserting spigot end, a further advantage of the above described so-called "roll-over lip" is that the skirt or roll-over lip can serve to retain a gasket upon initial installation in a bell in proper position not only at the time of on-the-job assembly, but with appropriate dimensioning, even sufficiently for the gasket to be installed in a respective bell of the pipe or other belled item as shipped by the manufacturer.

An additional advantage of the roll lip is that after a run of pipe has been installed in a trench, before any back filling is done, the pipe can be quickly inspected from the top of the trench to check for presence of a gasket at each joint, since the presence of the externally disposed lip on the external circumference of the bell at each joint is clearly and readily observable.

Referring to FIG. 5, there is shown a double-sealed expansion joint type coupling fitting 50, preferably of material similar to the pipes 10 to be joined, and having at the central, interiorly cylindrical wall portion 52 an inner bore and in effect counterbores at opposite ends forming the outer bells 20, each half then corresponding to the double-belled female pipe end of FIG. 1. A coupling fitting 50A in FIG. 6 is shown in section with contouring to a smooth form such as would be used with sewer or drainage pipe as now being fabricated from rigid synthetic plastic material such as rigid polyvinyl chloride.

Thus plain ends or spigots 11 of a pair of pipes 10 are inserted into opposite ends of the coupling fitting 50 into an end-to-end opposed axially spaced relation and each so as to snugly engage the inner wall portions 52 in the same manner as shown in and described for FIG. 1.

Within the spaces defined between the spigot ends 11 of the pipes 10 and the large bells 20 there are interposed a pair of respective gaskets 22, resulting in the same joint construction at each coupling end as above described with respect to FIGS. 1 through 4.

Each of these seals as above described include upon its inner surface the series of undercut inclined pipe sealing and gripping fins or ribs 40 and has at the respective outer end the annular lip flange 46 adapted to retainingly engage outer end portions of the expansion joint fitting.

The inner ends 11 of the pipes 10 are axially spaced apart as at 54 to accommodate for longitudinal expansion of said pipes during heating or cooling conditions.

The exterior conformation of body 42 to frictionally engage with a smooth interior of the pipe belled end 20 shown in FIGS. 1 and 3, or of the coupling fitting shown in FIG. 5 of FIG. 6, affords retention of the gasket in bell 20 and further, by gripping on the spigot end 11, also retention of the latter in 20 additionally to the snug fit retention of 11 in inner bell 14.

The description of the external gasket circmference and gasket contacted portion of the bell interior as being complementarily shaped, for the purpose contemplates not only some negative tolerance, obviously acceptable, but also contemplates as permissible some positive tolerance, that is, the outside diameter of the gasket body when rounded out, as being slightly larger than the inside diameter of the bell 20, say on the order of ½% oversize, in the sense previously defined; since the gasket is uniformly circumferentially compressible. This permits total contact of gasket outside circumference and bell internal circumference to aid in positive location and retention in said bell. Excessive gasket outside diameter however will cause wrinkling and failure to seal.

Quite important in the present invention is the fact that the gasket is not merely an axially small length doughnut or O-ring, but rather is a comparatively thin gasket with great reliance being placed upon the fact that it is rather long to fill a considerable part of the length of bell 20, i.e., of the depth of the annular recess, and there achieve frictional and compressive engagement for sealing and retention, without large radial flare or dimension increase at the outer bell.

Also important is the fact that the gasket material is pliable and compressible and non-deteriorating but also smooth, so that the male pipe end can easily be inserted therein. Polyvinyl chloride (PVC) happens to be a material presently widely available, well known in properties, material for which considerable fabricating know-how and experience has been accumulated, and is quite useful for the purposes here described having the additional advantage that it is non-deteriorating in use; but other materials as they appear may be found suitable.

In joint structures for drainage or sewer pipe systems as here exemplified, the hardness characteristics of the elastomeric gasket material, would be for polyvinyl chloride, a Shore A scale Durometer of 55 ± 5 preferred, that is, in the range of 50–60 Shore A; for neoprene gaskets, usually a Shore Durometer hardness of A 40 or somewhat higher; and the case of rubber, usually on the order of 70 A Durometer; thus for the more commonly used elastomers, in the range of 40–70 Shore A Durometer. However, it may be observed that if quite thin gaskets are designed or used, a softer durometer is generally preferable.

The gasket may be formed by any desired process appropriate to the material; for example, being molded in an annular form, but advantageously it may be made extrusion in long ribbons cut to appropriate lengths, each end-joined with itself into annular form to provide sealing gaskets substantially as shown in FIG. 2. Polyvinyl chloride lends itself desirably for this use because of the ease with which it can be molded or extruded in long ribbon form and, when cut to desired length, easily secured by thermoplastic welding at the ends of the cut pieces to form endless, that is, annular or collar type gaskets. PVC also is desirable since, when formed in a gasket of the shape here shown, it is pliable and easy to handle for assembling and being limp easy to package as well if so desired.

The configuration and function of the gasket are such that an identical extrusion section may be used in base or stock material for gaskets used in an entire range of plastic drainage pipe standard sizes belled in accordance with the invention, and also having a similar joint radial annular section, i.e., the same radial gap dimensioning of bell-and-spigot used for the gasket reception in all sizes. This is possible even with a gasket section with roll-over lip, if the bell wall thickness is the same from size to size; but where the bell wall thicknesses change through a size range, though the gasket principal section may be constant and even actual sections may serve respective pairs of successive nominal sizes because of lip elasticity, obviously as a practical matter there will have to be a change in the internal diameter of the lip or skirt 46a among the gaskets used in the range of 4 to 15 inch nominal sizes in which plastic pipe (rigid PVC or ABS) is now commonly available.

However, an expedient for obtaining accommodation, by one gasket section or profile, to a larger range of bell wall thickness is also indicated in FIG. 4. There in the roll over lip structure, the flange horizontal shoulder undersurface 46b has a notably greater radial dimension than the bell wall thickness, and beginning at the shoulder outer margin, the skirt portion 46a slopes inwardly, that is, decreases in diameter down to its bottom which comes into self-retentive embracing circumferential contact with the bell exterior for a bell having the smallest wall thickness desired to be accommodated. Since at the entrance into the annular recess formed by the roll over lip structure, the skirt is free to stretch circumferentially and radially from its normal disposition, bells of larger wall thickness can be received up to a limit established by the radial dimension of the undersurface 46b.

As the spigot end is introduced into the bell-emplaced gasket (with a soap or other conventional lubricant as may be desired), the end flange structure 46 or 46–46a restrains the gasket outer end, and the fins 40a, 40, 40 etc. are deflected inwardly axially, and radially outwardly with compression, as each is encountered by the spigot. Since there is no interlocking rib and groove inter-engagement of the gasket with the surrounding bell surface nor with the spigot surface, and these are smooth surfaces, the gasket is free (apart from the end stop engagement at 46, 46a) for relative axial shift upon overcoming the frictional forces between the surfaces of bell and gasket, so also between gasket and spigot end with respect to those ribs which have escaped over the spigot end edge.

Hence the engagement by the spigot with each rib successively induces also axial stretching in the gasket body portion tending to reduce radial thickness of the gasket, not only in the axial length already traversed by the spigot end, thus tending to reduce the frictional restraining force by ribs already passed, but also to some degree at each rib as it is being first traversed.

The gasket axial end spacing or clearance provided in the joint structure, that is, the axial spacing between the inner end of the installed gasket and the bottom of the annular recess receiving the same, (hence, the difference between the axial depth of the outer bell from its outer end in to the point where the constriction of the inner bell or throat occurs, and the axial length of the inserted part of the gasket), is of particular importance as affecting the ease of spigot insertion in a gasket otherwise acceptable for good seal attainment. If the gasket end in its installed free state comes down to the convergency toward the throat, the gasket is not entirely free readily to stretch axially over its length, and considerably more force is required for the insertion of the spigot end. Indeed this force may be excessive, unacceptably high, for some desired rib-to-gap proportions, when the gasket initially bottoms or has too small an axial end spacing.

On the other hand, where there is a considerable end clearance, for example, on the order of one-fifth to two-thirds of the gasket length, freedom of the gasket to stretch axially, as the pipe inserted end encounters successive fins or ribs, is assured for all ribs and despite manufacturing tolerances, which as described above under the stretching locally is tending to reduce the effective radial thickness of the gasket, thereby enabling the spigot end to enter more freely.

When the pipe end encounters the innermost rib or fin 40b, especially with the preferred form, as the inner rib provides an effective total radial thickness for the gasket at that region somewhat larger than the previously encountered fins, the rib is not passed quite so readily, and an overall stretch of the gasket is imposed (beyond that resulting successively by the successive engagements with the individual ribs previously encountered) tending to equalize the strain or displacement over the entire gasket axial length.

In addition to the freedom for local stretch allowed by smoothness of the gap-defining male and female surfaces, by location of the recess shoulder well beyond the gasket end in the stretched length condition, the stretching is more readily achieved, and finally the pipe is further able to advance beyond the stretched gasket to pass into the inner throat where it is snugly received.

At this point in the installation, when the inserting force is released, under particular tolerance conditions, possibly the pipe may back out slightly relieving the strain in axial direction on the gasket, if this has not already occured, while allowing the gasket to contract axially thickening up effectively and bringing the fins into a firm sealing relationship.

Normally, however, in the preferred arrangements, as the pipe end full diameter comes to the point of starting actually to pass the innermost rib, the axial strain will have been distributed or equalized over the gasket length, and when the pipe escapes the innermost rib to pass therethrough, and the spigot seats in the throat, axial contraction ensues in considerable degree with net radial thickening as above described to effect a more firm sealing by force additional to merely that engendered by a compression and radial deflection or distortion of the respective individual fins, which would of course be present even if a gasket is anchored in and to the bell at a plurality of axially spaced locations. Some small contraction may thereafter occur, further tightening up the contact of all the ribs around the spigot end increasing the seal thereabout.

Also in circumferential locations about the exterior of the gasket corresponding to the respective fins or rib locations, there for a corresponding reaction force effecting external circumferential sealings to the bell locally to greater extent at those regions but as well generally over the gasket length by urging the entire external circumferential cylindrical surface of the gasket out into tighter sealing conformity with the bell interior.

As a typical application, a joint with the bell and spigot relation shown in FIG. 6 may be considered for a nominal 4 inch size PVC plastic sewer pipe.

Assuming a typical plastic pipe wall thickness of ⅛ inch (0.125) for this nominal size, and an outside pipe (barrel) diameter, hence spigot diameter of (4.215) inches, then to receive the gasket an annular gap of ⅛ inch would be suitable.

Accordingly in a pipe, for the double-belled end formation, the pipe would first be enlarged to the throat region 14, by an amount on the order of the wall thickness, to give a throat with a slight outwardly expanding taper with outer end sized slightly larger than the outside diameter of the normal pipe, and appropriate tolerances to receive a spigot end of the same type of pipe in snug fit; and then from the throat further enlarged again by about the thickness of the pipe wall, to provide the outer bell and thus the annular gap for gasket reception, the transition from one diameter to another being made through appropriate merging curved offsets in accordance with conventional practice.

In the case assumed, the axial length of the transitions are appropriately to be: from the standard pipe diameter to the throat enlargement, on the order of 9/16 inch (0.562), that from the throat to the outer bell, say ⅜ inch (0.375); with the axial lengths of the cylindrical portions of outer bell and throat being respectively 1⅞ inches (1.875) and 11/16 inches (0.687), for a total length of the female end or double-bell formation of 3½ inches.

In this case, a successful gasket, having a total axial length on the order of 1½ inches (1.468), a length of 1¼ inches (1.250) beneath the shoulder of the radial flange 46, (that is, a nominal free insertion depth of 1¼ inches), and a nominal gasket thickness (i.e., of the inserted part) on the order of 3/16 inches (0.187), has in the postulated annularly cylindrical body, a radial thickness of 3/32 (0.093) inches, with six generally triangular fins (arcuately undercut except for the bottom fin terminating at the straight radial bottom edge of the gasket) having an inward projection from that body also of about 3/32 inches (0.094).

The upper surfaces of the fins in section show a substantially straight line, at about 76° to the radius (14° to the body) for the bottom fin and for the mouth-defining surface at the top fin, and at about 66° to the radius of the gasket (i.e., 24° to the body) for the four intermediate fins. A lip or skirt 46a, 3/16 long spaced out from the body by the bell wall thickness (⅛ inches) is useful.

Of the six fins, those above innermost fin had a nominal fin edge-to-edge (crest-to-crest) axial spacing of 3/16 inches (0.187), the spacing to or for edge of the bottommost fin being however, on the order of 0.252 inches.

Here the outward continuation to the gasket end of the topmost fin slant or sloped surface provides the mouth bevel with an axial length of about 15/32 inches (0.468) enlarging the top fin radius by 0.093 inches; in other words, the top surface of the top or fin rib 40a having a taper slightly smaller than that of the ribs therebeneath, since the rise of the rib height occurs over a longer axial distance.

Another gasket, with about 1⅝ inch inserted length, five fins, thickness again of 3/16 inch at the fin crest, 66½ top slopes (relative to radii), for the three intermediate fins crest spacings of 5/16 inch, the bottom surface of each fin being overhanging, i.e., running about perpendicularly from the crest out to the body of 1/16 inch thickness, and a bottommost fin with slope rounded to a somewhat tear drop shape of a 3/32 inch height, also is successful for plastic sewer pipe jointing as inserted in a ⅛ inch annular gap with a substantial end clearance to the gap bottom.

The gaskets of the above specific examples were made by end-joining to annular form extruded PVC sections of 60 Shore A Durometer hardness.

Thus a gasket, with a 3/16 (0.187) inch thickness (through the majority of the rib crests) and a nominal inserted axial length of 1¼ inches (1.250), is received in an annular gap of ⅛ inch radial dimension defined by a bell of 1⅞ depth to the beginning of the contraction to the throat, leaving an end clearance space, then or axial gap, on the order of ⅝ of an inch, amounting to about ½ of the inserted gasket length.

Preferably, as noted the bottommost or innermost fin 46b is slightly thicker, and of what might be termed half-tear drop shape, the gasket thickness at the innermost end rib, therefore the bottom end extreme dimension, being slightly greater than the radial thickness of the gasket at the crests of ribs or fins thereabove. However, with the fins thereabove somewhat undercut, and the inner end of the gasket radially equivalent thereto as an overhanging or perpendicular underfaced rib, the lowermost rib will be somewhat less deflectible or compressible than those above and appropriate for a gasket axial stretch purpose elsewhere discussed.

It will be observed that the joint provides a substantial insertion of the snug-fitted spigot end in the throat, and, as compared with the described O-ring sealed joint of the prior art, affords a wide spacing of the gasket from the throat-engaged end circumference of the spigot, in an outer bell which is relatively short and of smaller inside as well as outside diameter. These relations, conjoined with the narrow annular gap dimension and the relatively thin and long gasket, even under extreme beam deflection type loading conditions minimize angular displacement of joined elements at the joint and opportunity for extreme local compression of one side of the gasket which would weaken seal or cause leakage at other gasket regions, especially by relief of sealing forces at the area diametric to the load-compressed region.

The utility of the joint construction in joining other smooth surfaced elements, e.g., glass, or smooth metal, particularly copper drainage pipe should be noted.

Though not completely understood with certainty, it is believed that the effectiveness of the disclosed joint is due to the successive incremental axial stretching of the gasket, during spigot insertion, as permitted by the end clearance with behaviour previously described.

What is claimed is:

1. For use with plastic or other pipes of a size of about 1½ inches and larger, a joint construction wherein:
   one piping element has a smooth plain spigot or cylindrical male end;
   a second piping element has a female end receiving said male end,
      said female end having an inner length portion with an inside diameter tapering inwardly from a size slightly larger than the outside diameter of said male end so that it as a substantially cylindrical socket circumferentially snugly receives the male end for coaxial alignment;
      said female end having an outer length portion interiorly cylindrical as a bell with an inside diameter defining an annular space with and around the male end; and
   improved sealing means comprising a pliable annular thin ribbon-bodied gasket received within the outer length portion in said annular space,
      in axial length about equal to that of the said outer length portion, but affording an endwise clearance of the gasket inner end from the bottom of said annular space as emplaced therein, before insertion of a spigot;
   said gasket being of smooth surfaced polyvinyl chloride or the like elastomer,
   said gasket having a plurality of at least three integral pliable internal annular gripping fins axially spaced on the inner circumference of its body,
   the said fins being defined respectively each by a female conical outer surface decreasing in diameter axially inwardly and an inner surface running from the said outer conical surface outwardly to the body, and
   all fins outward of the innermost fin being each undercut to have the inner surface thereof make an acute angle with the body and said body having, as emplaced, a cylindrical external circumference conformed to the cylindrical interior circumference of the said outer length portion, to sealingly engage and hold the male end and hold the gasket firmly in said space and seal such space;
   said gasket being provided on the external circumference of its outer end with an integral circumferential flange engaging the outer end edge of said bell to anchor the gasket outer end during insertion of a spigot end through the emplaced gasket into said female end.

2. The joint construction of claim 1, wherein the outer end of said gasket has an outwardly expanding tapered inner surface continuous with the female conical surface of the outermost fin as a mouth adapted to guidingly receive said spigot or male end.

3. For use in joining plain spigots or straight cylindrical male ends of plastic or other externally smooth pipes, an expansion joint construction provided by a coupling fitting, the said spigots and respective gaskets, said fitting having a longitudinally central inner bore terminating at opposite ends in respective counterbores, each counterbore and the adjacent part of said inner bore being a female end receiving a respective spigot end of the joined pipes and a respective said gasket and constituting a respective joint construction as defined in claim 1, the ends of the spigots being spaced apart axially in said inner bore.

4. The joint construction as described in claim 1, wherein the said gasket is provided with a lip circumferentially continuously extending from said flange in axially outwardly convergently spaced relation to the body to define a bell-end-embracing annular recess.

5. The joint construction as described in claim 1, wherein said gasket is comprised of an elastomer with a Shore Durometer value of from A-40 to A-70.

6. For use with plastic or other smooth surfaced piping elements, such as plastic pipe, pipe fittings and liquid handling devices connected thereto, in low pressure or gravity flow service, and electrical and telephone conduiting, a sealed joint construction comprising:
an externally smooth, non-grooved, non-ribbed spigot male joined element end;
an internally smooth non-grooved, non-ribbed, bell-like female joined element end;
said ends telescoped in bell-and-spigot fashion to define an annular recess of narrow gap or width and of considerable axial depth as compared with the gap, and with the female element, inward of said recess, contracting in inside diameter from an outer bell portion to an inner female portion having an inside diameter providing a substantially cylindrical socket receiving and embracing an inmost inserted spigot end portion;
and
inserted in te recess, a limp, pliable annularly unitary, thin gasket made of smooth-surface elastomer such as polyvinyl chloride or the like;
said gasket comprising a thin sleeve-like body externally smooth and
having a set of axially spaced, integral pliable internal annularly continuous sealing and gripping fins or ribs, and
on the outer gasket end, a circumferentially continuous external radial flange to engage the bell endwise;
the gasket having as an outer end mouth, an internal, spigot lead-in bevel, and one said rib occurring at the gasket inner end;
the axial length of the gasket portion insertable in said recess being, in the gasket free state, shorter than the recess depth,
the radial thickness of the ribs plus body being greater than the recess gap;
said ribs being of shape and thickness to be, when the gasket is located in the bell, compressed and deflected by the entering spigot end, and enabling the spigot end, in encountering resistance of the successive ribs, axially to stretch and thereby radially thin the gasket, as permitted by the smooth cylindrical forms of the gasket exterior and bell interior and the recess depth exceeding the gasket inserted length, whereby seal is achieved upon spigot insertion past the inner rib and ensuing relief of gasket stretch.

7. The joint construction as described in claim 6, wherein said gasket is comprised of an elastomer with a Shore Durometer value of from A-40 to A-70.

8. The joint construction as described in claim 6, wherein
the said gasket is provided with a lip circumferentially continuously extending from said flange in spaced relation to the body to define a bell-end-embracing annular recess;
the inner surface of said lip tapering away from said radial flange inwardly toward a cylindrical exterior of said body, thereby to define a mouth, for the bell-end-embracing recess, having, in the totally free gasket condition, a radial dimension less than that of said flange,
whereby the embracing recess will accept readily a bell with wall thickness less than the radial dimension of the flange and greater than that of the embracing recess and also will accept bells of a range of wall thicknesses.

9. The joint construction as described in claim 6, wherein those ribs outward of the inner end rib are of shape and thickness to be, relative to the inner end rib, more readily cmpressed and deflected, with the gasket located in the bell, by the entering spigot end,
whereby the spigot end, in encountering and passing the inner end rib, is enabled further axially to stretch the gasket over its body length with sealing achieved upon spigot insertion past the inner rib and consequent relief of gasket stretch.

10. The joint construction as described in claim 6, wherein said inmost spigot end portion has, with the said inner female portion, a light interference fit allowing relative motion for expansion joint function.

11. The joint construction as described in claim 6, wherein said gasket body in its totally free condition is slightly oversize in outside diameter relative to the inside diameter of said outer bell portion, whereby upon manual insertion in the bell the body exterior is conformable circumferentially with a corresponding length portion of the bell interior for self-retention of the gasket.

12. The joint construction as described in claim 6, wherein each said rib or fin, in the direction axially inwardly of the gasket, increases in section from the interior of the body to a crest, forming an annular slope surface of decreasing diameter to the crest where it meets an undersurface returning abruptly to the body.

13. The joint construction as described in claim 12, wherein said ribs or fins are undercut at said undersurface.

14. The joint construction as described in claim 12, wherein one rib or fin of the set occurs near the outer end of the gasket with its slope surface being a continuation of said lead in bevel.

15. The joint construction as described in claim 14, wherein said set contains at least four ribs or fins.

* * * * *